United States Patent
Yang et al.

(10) Patent No.: US 9,116,549 B2
(45) Date of Patent: Aug. 25, 2015

(54) ELECTRONIC DEVICE HAVING INPUT CONTROL APPLICATION

(71) Applicants: Chih-Lung Yang, Changhua (TW); Jung-Chou Liang, Changhua (TW); Shu-Ya Yang, New Taipei (TW); Man-Fang Huang, Changhua (TW)

(72) Inventors: Chih-Lung Yang, Changhua (TW); Jung-Chou Liang, Changhua (TW); Shu-Ya Yang, New Taipei (TW); Man-Fang Huang, Changhua (TW)

( * ) Notice: Subject to any disclaimer, the term of this patent is extended or adjusted under 35 U.S.C. 154(b) by 203 days.

(21) Appl. No.: 13/968,925

(22) Filed: Aug. 16, 2013

(65) Prior Publication Data

US 2014/0049468 A1 Feb. 20, 2014

(30) Foreign Application Priority Data

Aug. 16, 2012 (TW) ............... 101129819 A
May 29, 2013 (TW) ............... 102119015 A

(51) Int. Cl.
*G06F 3/02* (2006.01)
*G06F 3/01* (2006.01)
*G06F 3/023* (2006.01)
*G06F 3/0489* (2013.01)

(52) U.S. Cl.
CPC *G06F 3/02* (2013.01); *G06F 3/018* (2013.01); *G06F 3/0236* (2013.01); *G06F 3/04892* (2013.01)

(58) Field of Classification Search
CPC ....... G06F 3/02; G06F 3/04892; G06F 3/018; G06F 3/0236
See application file for complete search history.

(56) References Cited

U.S. PATENT DOCUMENTS

2008/0250352 A1* 10/2008 Zaliva ............... 715/816
2012/0072868 A1* 3/2012 Metso et al. ........ 715/810

* cited by examiner

*Primary Examiner* — Adam R Giesy
(74) *Attorney, Agent, or Firm* — Muncy, Geissler, Olds & Lowe, P.C.

(57) ABSTRACT

An electronic device having an input control application is disclosed. The input control application is used for enabling the electronic device to execute the following actions: obtaining a member group comprising members lined up orderly and a member as a selection member; pressing a key to generate a first signal for excluding members after the selection member, then determining if only one member left in the member group, if "No", determining the member of the member group in the middle as the new selection member, if "Yes", executing the input operation; pressing another key to generate a second signal for excluding the members before the current selection member, then determining if only one last member in the current member group, if No", determining the member of the member group in the middle as the new selection member, if "Yes", executing the input operation.

10 Claims, 14 Drawing Sheets

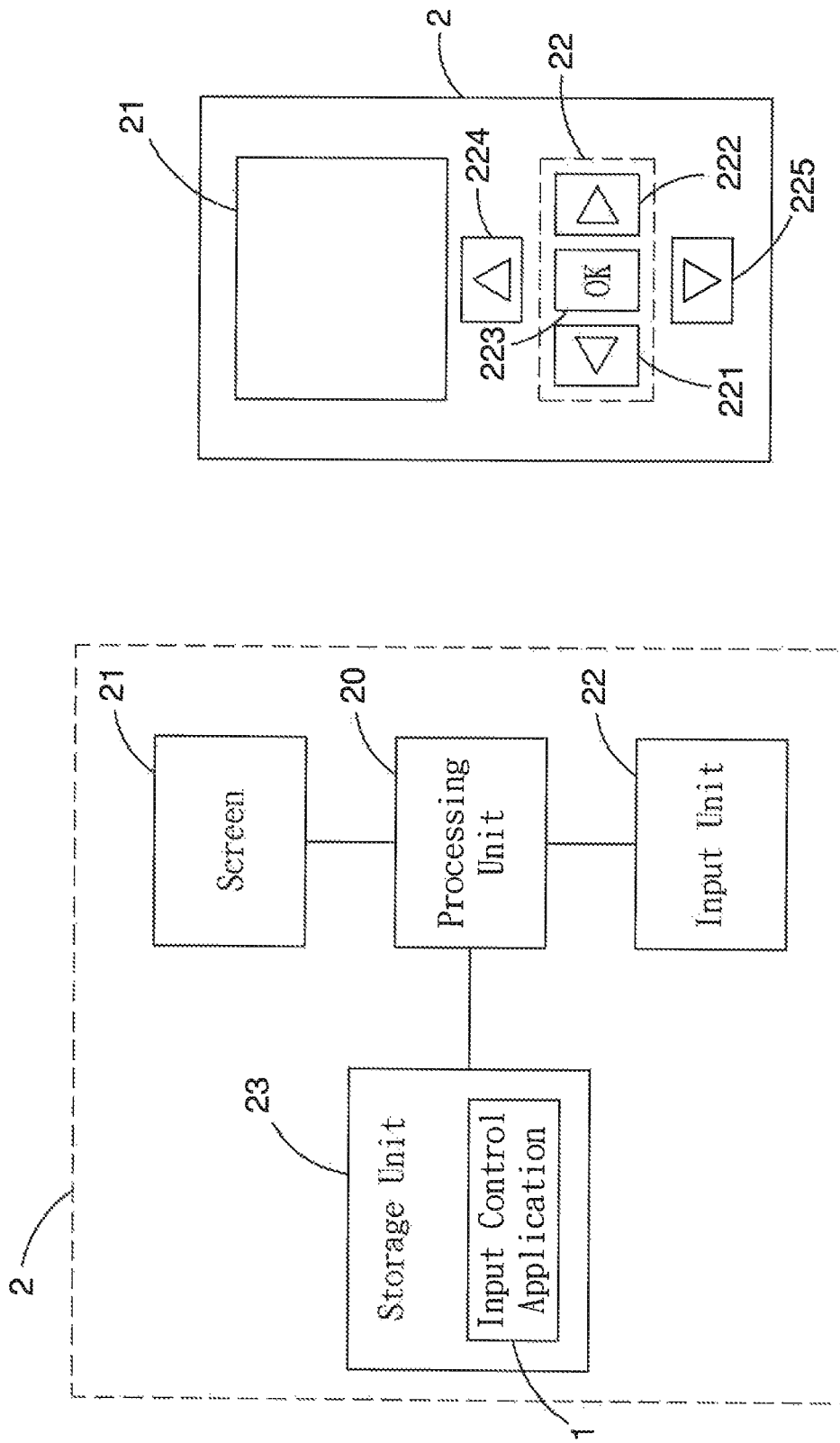

ELECTRONIC DEVICE HAVING INPUT CONTROL APPLICATION

BACKGROUND OF INVENTION

1. Field of Invention

The present invention relates to an electronic device having mechanisms for inputting texts and controlling a cursor, in particular, relates to an electronic device used for inputting texts and controlling cursor movement with small number of keys.

2. Related Prior Art

As a result of design miniaturization, compact electronic devices such as a smart phone, a MP3/MP4 player, an event data recorder, and a GPS usually provide a small number of keys for performing input to users, which is inconvenient to user. It is desired in the market to provide an electronic device using an innovative input method which allows users to input texts or move a cursor with a small number of keys.

SUMMARY OF INVENTION

The present invention provides an electronic device comprises a processing unit, a screen, an input unit and a storage unit. The storage unit has an input control application. The input unit is a keypad. The processing unit receives signals generated by the input unit, and executing actions according to the input control application. The actions comprising: obtaining a member group, the member group comprising members lined up orderly, and one of the members is a selection member; when the signal is a first signal, excludes the members after the current selection member, then determining if there is only one last member in the current member group, if the determining result is "No", determining the member of the member group which is lined up in the middle or before the middle or after the middle as the new selection member, if the determining result is "Yes", executing an input operation; when the signal is a second signal, excludes the members before the current selection member, then determining if there is only one last member in the current member group, if the determining result is "No", determining the member of the member group which is lined up in the middle or before the middle or after the middle as the new selection member, if the determining result is "Yes", executing an input operation. Preferably, the above mentioned input operation comprises entering the last member in the editing column on the screen.

The method of the present invention is used for inputting characters such as numbers, English letters, Mandarin Phonetic Symbols, or punctuation marks in the electronic device. With minor changes, the method of the present invention is applicable for controlling the left-right up-down movements of the cursor. The control mechanism only requires operations with a few keys to achieve the desired control result.

BRIEF DESCRIPTION OF DRAWINGS

FIG. 1 is a system block diagram of an electronic device according to the present invention;

FIG. 2 is a plan schematic diagram of an electronic device according to the present invention;

DETAILED DESCRIPTION OF EMBODIMENTS

Figure 3:
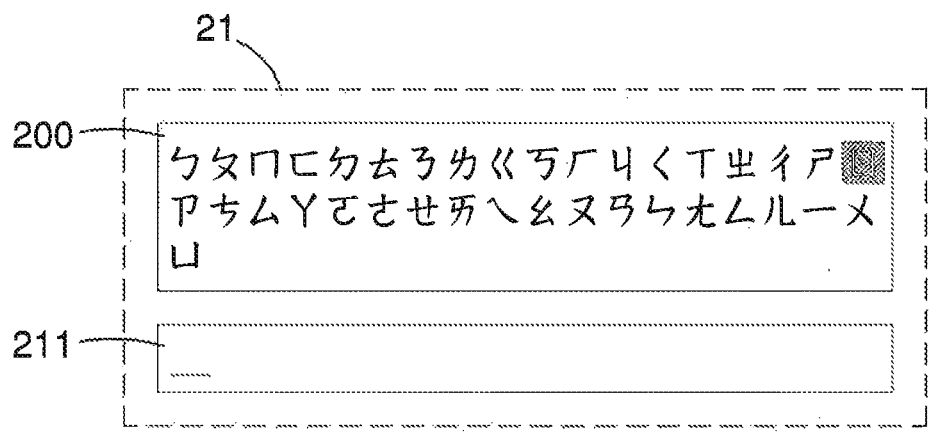
FIG. 3 to FIG. 26 are diagrams illustrating the display content on the screen used for explaining the process of a user selecting members.

FIG. 1 is a system block diagram of an internal circuit of an electronic device 2 according to the present invention. FIG. 2 is a plane schematic diagram of an electronic device 2 according to the present invention. The electronic device 2 comprises a processing unit 20, a screen 21, an input unit 22 and a storage unit 23. The processing unit 20 loads and executes an input control application 1 in the storage unit 23. In the embodiment, the electronic device 2 is a mobile phone, or an electronic device such as a hand held game console, TV game console, a TV offering digital services with a controller.

The processing unit 20 at least comprises a CPU and a RAM. The screen 21 preferably is a Liquid Crystal Display (LCD). The storage unit 23 is a flash memory or other non-volatile storage device.

The input unit 22 generates different signals to the processing unit 20 corresponding to different operations. In the embodiment, the input unit 22 is a key module of the electronic device 2, such as a keypad on a mobile phone or a keypad on a TV remote controller. Such keypad preferably comprises three keys, i.e. a back key 221, a next key 222 and an enter key 223 (or OK key). If required, the input unit 22 may further comprises other keys, for example an up key 224, a down key 225 or a delete key, a space key (not shown in the diagrams) etc. When the user press a back key 221, a next key 222, an enter key 223, a up key 224 or a down key 225 once, the input unit 22 correspondingly generates a first signal, a second signal, a third signal, a fourth signal or a fifth signal to the processing unit 20.

The input unit 22 can be a wheel module having a wheel (not shown in the diagrams). When a user operates wheel by moving the wheel forward once, moving the wheel backward once, and pressing the wheel once, the input unit 22 correspondingly generates the first signal, the second signal, and the third signal to the processing unit 20.

The input unit 22 also can be an eye control module for detecting the eye movement (not shown in the diagrams), for example a CEye Eye Control Module from the Tobii Company. Each time a user moves the eye balls to the right once, moves the eye balls to the left once, and blinks the eyes once, the input unit 20 correspondingly generates the first signal, the second signal, the third signal to the processing unit 20.

The input unit 22 also can be a voice recognition input module for recognizing voice instructions. When a user makes instructions such as "up", "down", "input" etc., the input unit 22 correspondingly generates a first signal, a second signal, a third signal to the processing unit 20.

The input unit 22 can further be a human motion sensing input module. When a user waves the hands up once, waves the hands down once, and claps the hands once, the input unit 20 correspondingly generates the first signal, the second signal, the third signal to the processing unit 20.

The processing unit 20 executes actions according to the input control application 1, the actions comprising:

a) Obtain a member group. The member group has members lined up orderly. The group member are lined up based on numerical order ("1"~"9"), on alphabetical order of upper case English letter ("A"~"Z"), or alphabetical order of lower case English letter ("a"~"z"), or Mandarin Phonetic Symbol ("ㄅ"~"ㄩ"), or a predetermined lined-up symbols (for example punctuation marks), or the stroke count of Chinese characters (or radical words of Chinese characters), or horizontal coordinates of the screen 21 (for example (0,0)~(1024, 0), or vertical coordinates of the screen 21 (for example (0,0)~(0,768)). The order of the members in the member group is not limited to sequential order, for example the member group having three members (0,0), (512,0) and (1024,0) located on the same horizontal line. Preferably, the group members in the member group can be switched with the members of other groups, for example, from the number group to the upper case English letter group, which is detailed in the following. Wherein, one of the group members is predetermined as the selection member, preferably the member in the middle or the member after the middle is determined as the selection member. For example, if there are 10 members, which are numbers "0"~"9", in the current member group, the member in the exact middle does not exist. Accordingly, the "4" before the middle or the "5" after the middle is determined to be the selection member. For another example, if there are only 5 members from "0"~"4" in the current member group, then "2" is the member in the exact middle, which is required to be determined as the selection member. In addition, the member order can be determined by users. For example, line up the frequently used members next to the selection member, and line up least frequently members away from the selection member.

b) Upon receiving the signals from the input unit 22, selectively execute one of the following operating steps:

The first operating step: when the signal is the first signal generated after pressing the back key 221, the members currently lined-up after the selection member in the member group are excluded from the member group. Preferably, the selection member is excluded from the member group too. Next, determining if there is only one member left in the current member group. If the determination result is "No", the member in the middle or before the middle or after the middle is determined to be the select member; and if the determination result is "Yes", executes an input operation according to the last member, for example the last member is entered in an editing column displayed on the screen 21.

The second operating step: when the signal is the second signal generated after pressing the next key 222, the members currently lined-up before the selection member are excluded from the member group, preferably, the selection member is excluded from the member group too. Next, determining if there is only one member left in the current member group. If the determination result is "No", the member in the middle or before the middle or after the middle is determined to be the select member; if the determination result is "Yes", executes an input operation according to the last member, for example the last member is entered in an editing column displayed on the screen 21.

The third operating step: when the signal is the third signal generated after pressing the enter key 223, the selection member in the current member group is entered into the editing column.

Next, the above mentioned input control application is illustrated in an example inputting Chinese texts. The member group and the editing column are displayed in the screen 21 as the member group 200 and the editing column 211 are displayed in the FIG. 3 and FIG. 10. A group in the member group 200 has members from "ㄅ"~"ㄩ" offered for user selection. The "ㄩ" is lined up in the middle is predetermined as the selection member. Preferably, the selection member is highlighted so that the user can recognize easily.

Figure 4:
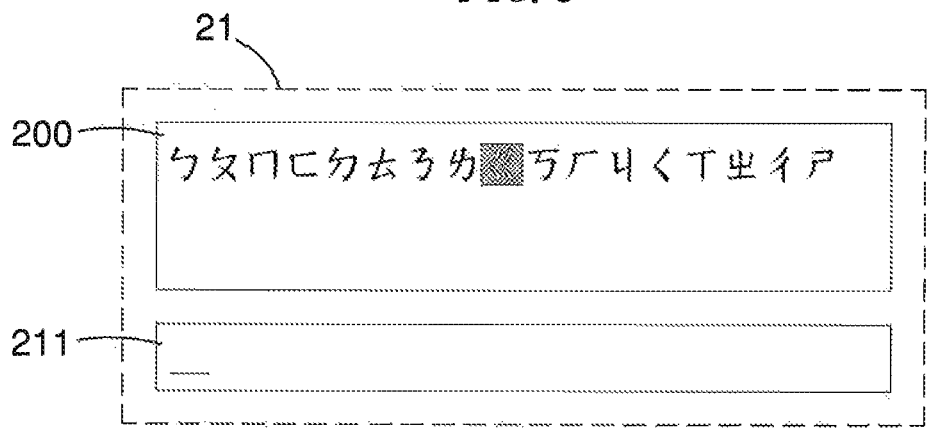

First, the first member which the user desires to input is "ㄋ" and "ㄋ" is the member lined up before the selection member "ㄩ". Naturally, the user may perceive to search backwards and press the back key 221 according to the perception, which triggers the input unit 22 to generate a first signal to the processing unit 20. The processing 20 unit executes the above mentioned first operating step, i.e. excluding the selection member "ㄩ" and all the members "ㄆ"~"ㄩ" which are lined up after the selection member "ㄩ" as shown in FIG. 4. Next, the processing unit 20 determines that there are several members in the member group 200. Then, "ㄍ" is determined to be the new selection member. There are 17 members left "ㄅ"~"ㄆ" 17 members left in the current member group 200, "ㄍ" is lined up in the middle between "ㄅ"~"ㄆ", accordingly, "ㄍ" is determined as the new selection member.

Figure 5:
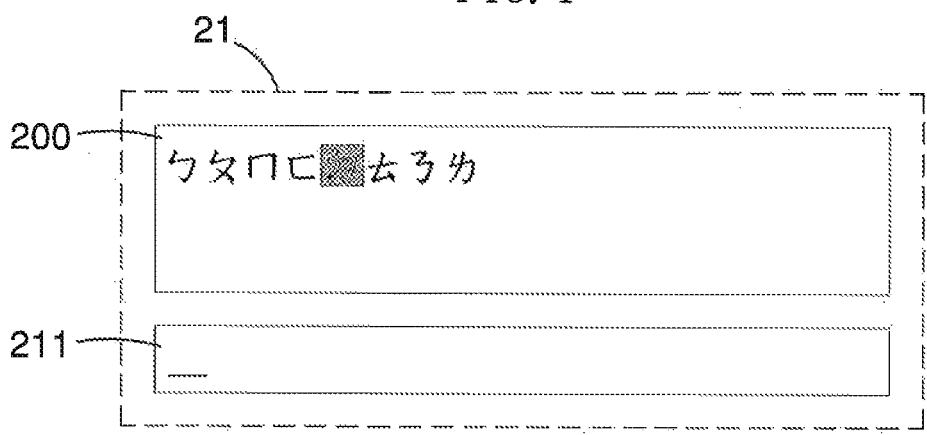

The "ㄋ" which the user desires to input is still lined up before the current selection member "ㄍ", the user further presses the back key 221 once to trigger the input unit 22 to generate a first signal to the processing unit 20. The processing unit 20 again executes the first operating step. Consequently, there are only members "ㄅ"~"ㄉ" left in the member group 200, and "ㄉ" lined up after the middle is determined as the new selection member as shown in the FIG. 5.

Figure 6:
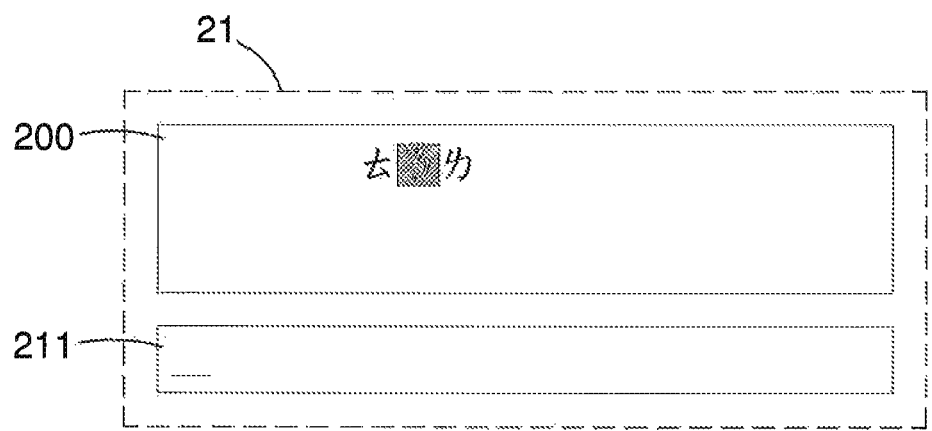

At the time, "ㄋ" which the user desires to input is after the selection member "ㄉ" in the current member group. The user may perceive to search backward. The user presses the next key 222 once according to the perception which triggers the input unit 22 to generate a second signal to the processing unit 20. The processing unit 20 executes the above mentioned second operating step, i.e. excluding the selection member "ㄉ" and the members "ㄅ"~"ㄈ" currently lined-up before the selection member "ㄉ" as shown in FIG. 6. Then, "ㄋ" which is lined-up in the middle in the member group 200 is determined as the new selection member.

The selection member in the member group 200 then is the first member "ㄋ" which the user desires to input. At the time, the user presses the enter key 223 once which triggers the input 22 to generate a third signal. The processing unit 20 receives the third signal and correspondingly executes the above mentioned third operating step, i.e. the selection member "ㄋ" is entered in the editing column 211. Thus, the user completes inputting the first member "ㄋ".

Provided the first member which the user desires to input is "ㄌ" instead of "ㄊ" or "ㄋ", and the actions move to the scenario shown in FIG. 6. Because "ㄌ" is lined up after "ㄋ", the user presses next key 222 once to generate a second signal, the processing unit 20 correspondingly executes the second operating step based on the second signal to exclude "ㄊ" and "ㄋ" are both excluded in FIG. 6. At this point, the processing unit 20 determines there is only one member "ㄌ" in the member group 200 and "ㄌ" is directly entered in the editing column 211. Thus, the user the user completes inputting the first member "ㄌ".

Provided the first member which the user desires to input is "ㄊ" instead of "ㄋ", and the actions move to the scenario shown in FIG. 6. Because "ㄊ" is lined up before "ㄋ" and the user presses the back key 221 once to generate a first signal, the processing unit 20 correspondingly executes the first operating step based on the first signal to both exclude "ㄋ" and "ㄌ" in FIG. 6. At this point, the processing unit 20 determines there is only one member "ㄊ" in the member group 200 and "ㄊ" is directly entered in the editing column 211. Thus, the user the user completes inputting the first member "ㄊ".

Figure 7:
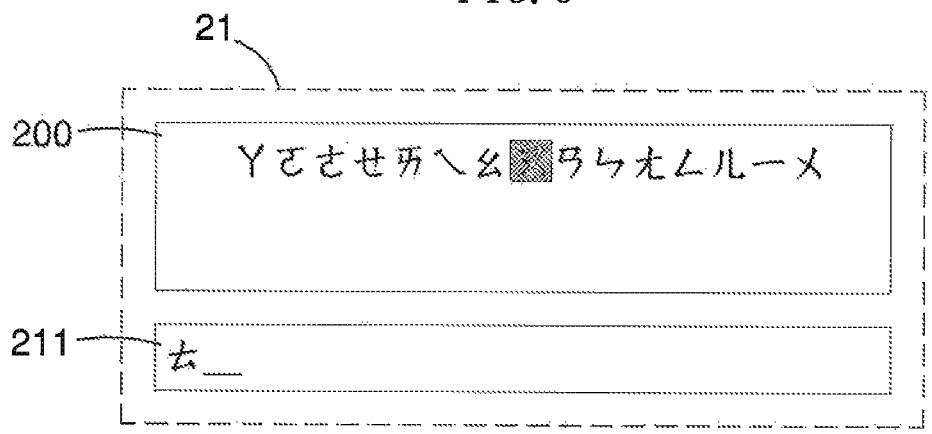

The above actions further comprises a change step. When the last member or the selection member in the member group 200 is entered in the editing column 211, the processing unit 20 executes a change step used for switching members in the member group 200 with new members in another group, and determining a member in the middle, before the middle or after the middle as the selection member. The new member and the member in the current editing column 211 is associated, for example associated phonetically. For example, in FIG. 7, when "ㄊ" is entered in editing column 211, the processing unit 20 switches the members in the member group 200 with a new member, the new member is from a group of the members associated phonetically with "ㄊ" such as ㄧ, ㄜ ... ㄨ etc., the member lined-up in the middle "ㄡ" is determined as the selection member and highlighted. Next, the user proceeds with inputting the second member according to the process mentioned above and the process is not repeated hereto.

Figure 8:
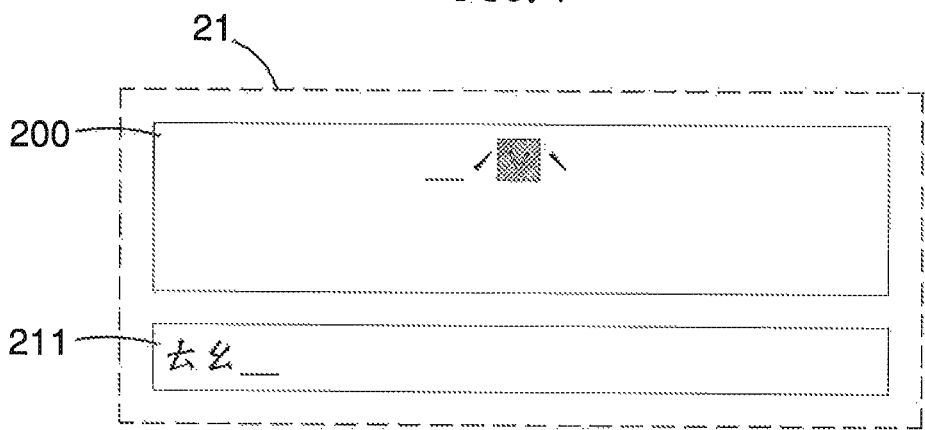

In FIG. 8, two members "ㄊ" and "ㄠ" are entered in the editing column 211 respectively. When "ㄠ" is entered in the editing column 211, as mentioned previously, the processing unit 20 executes a change step to enable the member group 200 to list new members associates with "ㄊㄠ", wherein "ㄠ" is a final, and the new member corresponds to a tone symbol: the first member is "space" representing the first tone, the second to the fourth member respectively are "ˊ", "ˇ", "ˋ" representing respectively the second~fourth tone, and "˙" which is lined up after the middle is determined as the selection member. In the embodiment, the new member and the member "ㄊㄠ" in current editing column 211 are associated phonetically. Next, the user proceeds with inputting the third member according to the process mentioned above and the process is not repeated hereto.

Figure 9:
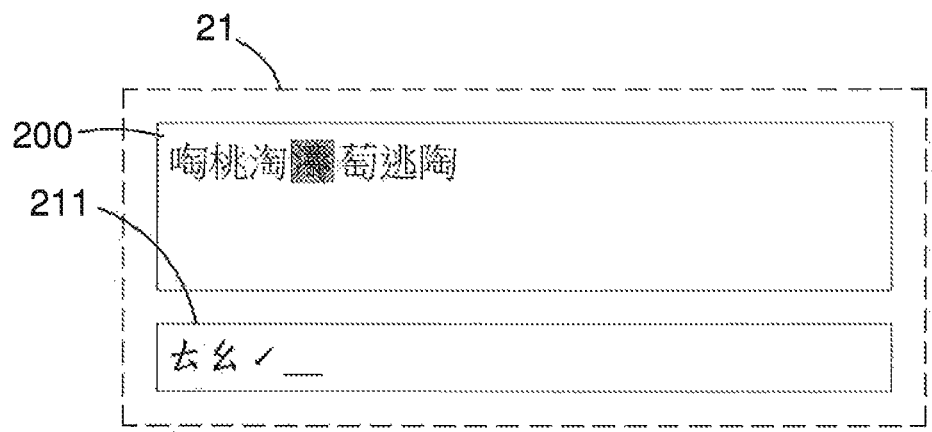

In FIG. 9, the user proceeds to inputting the third member "ˇ". When "ˇ" is entered into the editing column 211, as mentioned previously, the processing unit 20 executes a change step to enable the member group 200 to list new members associates with "ㄊㄠˇ". Because "ㄊㄠˇ" is a complete segment of the Mandarin Phonetic Symbol, the new member corresponds to a Chinese homophone character and "濤" which is lined up in the middle is determined as the selection member. In the embodiment, the new member and the member "ㄊㄠˇ" in the current editing column 211 are phonetically associated. Next, the user proceeds with inputting the fourth member according to the process mentioned above and the process is not repeated hereto.

Figure 10:
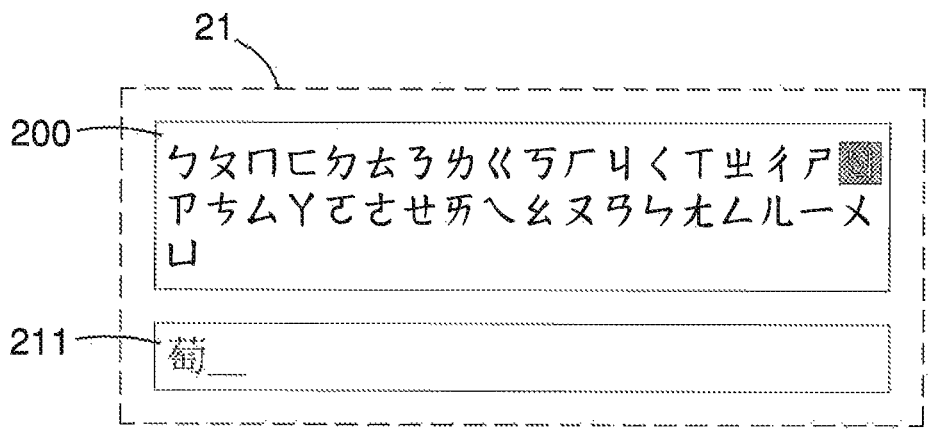
Figure 11:
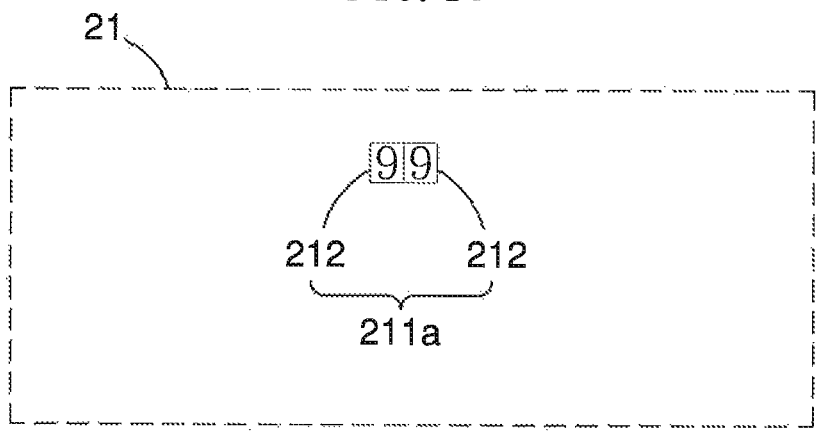

In FIG. 10, the user proceeds with inputting the fourth member which is a Chinese character "萄". When "萄" is entered in the editing column 211, as mentioned previously, the processing unit 20 executes a change step. Different from the above mentioned, because the first Chinese character is inputted at this point, the processing unit 20 executes the change step to change from the member group 200 to the previous members "ㄅ"~"ㄩ" and determines the a member in the middle or before the middle or after the middle as the selection member. In the embodiment, "ㄖ" which is lined up in the middle is predetermined as a selection member. The above mentioned input control application further comprises a replace step used for simultaneously executing executes a replace step upon the processing unit 20 executing the above mentioned change step, wherein the member immediately entered in the editing column 211 replaces the member in the editing column 211. In the embodiment, "萄" replaces "ㄊㄠ" in the editing column 211. Next, the user proceeds with inputting the second Chinese character according to the process mentioned above and the process is not repeated hereto.

In the embodiment mentioned above, the user only uses three keys, i.e. the back key 221, the next key 222 and the enter key 223 for inputting the Chinese character in the electronic device 2.

Next, the above mentioned input control application is illustrated in an example inputting numbers. In the embodiment, the member group is hidden and not displayed on the screen 21, and the members in the member group are two digit numbers "99"~"00". The selection member is determined as the maximum or the minimum numbers, for example "99" or "00". The selection member is directly entered and displayed in a editing column 211a on the screen 21. The editing column 211a comprises one or several sub columns 212. Each sub column 212 displays a number among "0"~"9". The quantity of the sub columns 212 corresponds to the length of the member. For example, if members in the member group are "0"~"9", only one sub column 212 is displayed, and if the members in the member group are "000"~"999", threes sub columns 212 are displayed, and so on. In terms of the generating method of a sub column 212, in the embodiment, a sub column 212 is generated according to the above mentioned first signal, i.e. the user presses the back key 221 once, the processing unit 20 correspondingly generates a sub column 212 displayed on the screen 21.

Provided the member which the user currently desires to input is a number "48". Because the member is a two digit number, the user has to presses the back key 221 twice for generating two sub columns 212 correspondingly in order to form the editing column 211a on the screen 21. Next, the user has to press the next key 222 representing the editing column 211a is generated. In the embodiment, the members "99"~"00" in the member group are lined up by descending order. The predetermined selection member is the first number "99" in the member group, and "99" is entered in the editing column 211a on the screen 21 accordingly. Then the actions moves to inputting the following member (numbers).

Figure 12:
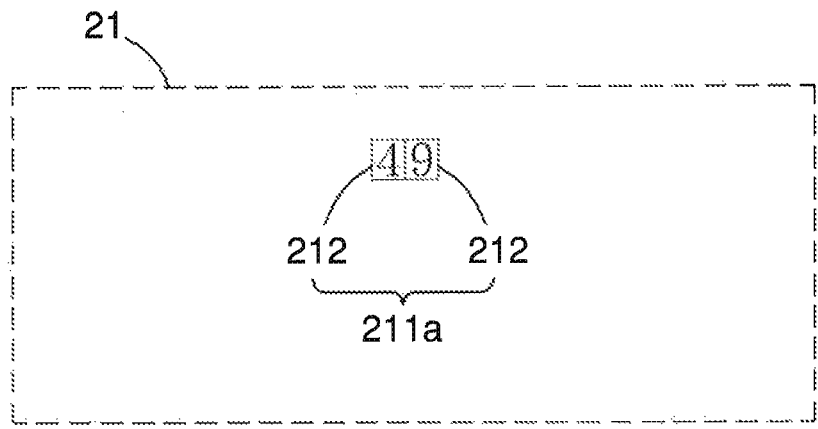

Because the member "48" to input currently is lined up after the current selection member "99", the user may perceive to search backward, and press the next key 222 according to the perception, which triggers the input unit 22 to generate a second signal to the processing unit 20. The processing 20 unit executes the above mentioned second operating step, i.e. excluding the selection member "99" and all the members lined up before the selection member, and then the processing 20 unit determines the member in the middle or before the middle or after the middle in the member group as the new selection member which is displayed in the editing column 221a. Nonetheless, the members are lined up by descending order, the first member is 99 and there is no member lined up in front of "99". Accordingly, only "99" is excluded in the second operating step executed, the members left in the member group are "98"~"00". It should be noted that "49" is lined up before the middle of "98"~"00". After the processing unit 20 executes the second operating step, the "49" is determined to be the new selection member. In the embodiment, the selection member "49" is directly entered in editing column 211a, as shown in FIG. 12.

Next, the user perceives to search backwards because "48" is lined up after "49", the user presses the next key 222 once, and the result is that there are only members "48"~"00" left in the member group ("49" and the members "98"~"50" before "49" are excluded), and the "24" in the middle is determined as the new selection member.

Figure 13:
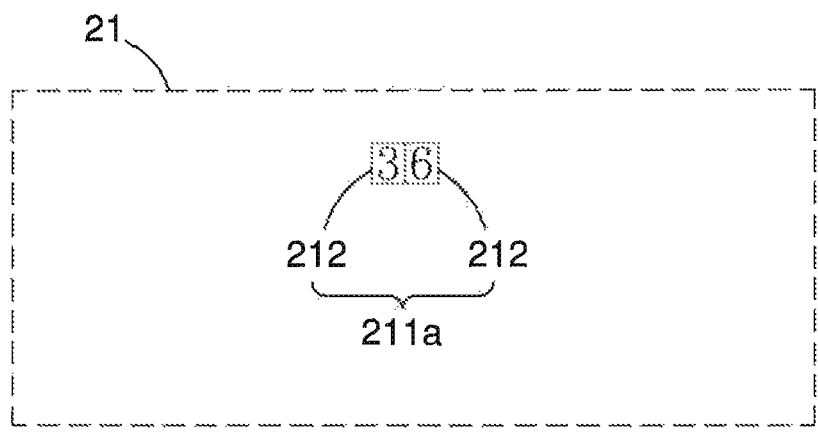
Figure 14:
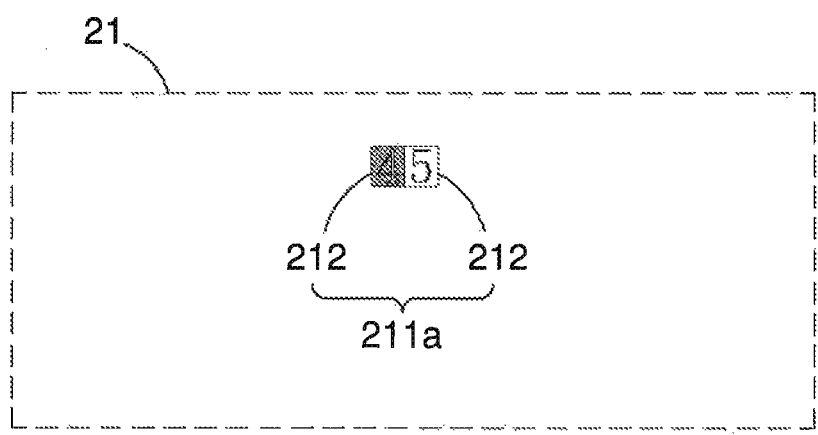

At this point, the member to input "48" is lined up before the current selection member "24", the user perceives to search backward, and press the back key 221 according to the perception, which triggers the input unit 22 to generate a first signal to the processing unit 20. The processing 20 unit executes the above mentioned first operating step, i.e. excluding the selection member "24" and all the members "23"~"00" lined up after the selection member, and there are only members "48"~"25" left in the member group. Then, the processing 20 unit determines the member "36" after the middle in the member group as the new selection member as shown in FIG. 13. The user presses corresponding keys following the same logic flow, and the members left in the member group are less and less. Following the operating steps, the selection member is then determined as "42" (at this point, there are only 12 members "48"~"37" left in the member group) □"45" (at this point, there are only 6 members "48"~"43" left in the member group) □"47" (at this point, there are only 3 members "46"~"48" left in the member group). As shown in FIG. 14, when the selection member is "45" and the ten digit of all other members are also "4", then "4" is determined as the number of first sub column 212. The processing unit 22 highlights the "4" representing "4" is locked and does not respond to key operations.

Figure 15:
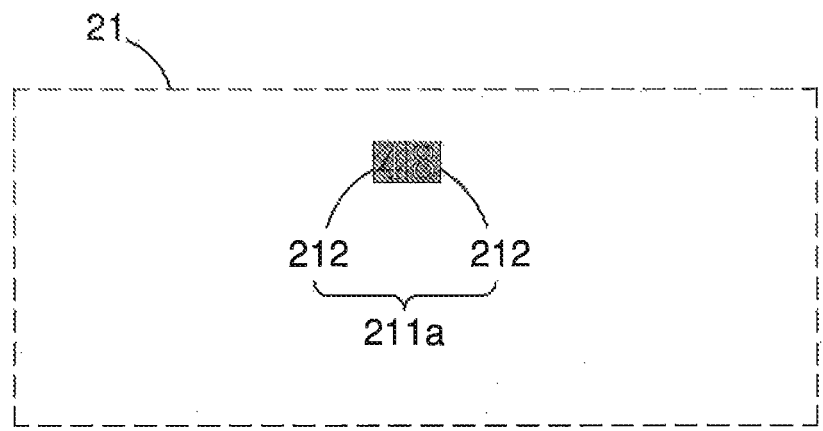

When the selection member in the member group is "47", the user perceives to search backward and presses the back key 221 once, there is only "48" left in the member group. Because "48" is the last member, "8" is then determined as the number in the second sub column 212. The processing unit 22 highlights the "8" representing "8" is locked and does not respond to key operations. Thus, the member "48" is entered in the editing column 211a, as shown in FIG. 15, which means the user has completed inputting the number "48".

In the embodiments shown from FIG. 11 to FIG. 15, the user uses two keys, i.e. the back key 221 and the next key 222 for inputting the number in the electronic device 2.

In addition, according to the above mentioned description, the member group can be configure11d to display or not display on the screen 21. There are many members displayed in the beginning and the member count in the member group decreases as the user operating with pressing keys. The member count decreases by half after each operation step, the selection member or the last member is entered and displayed in the editing column 211 or 211a on the screen 21.

Figure 16:
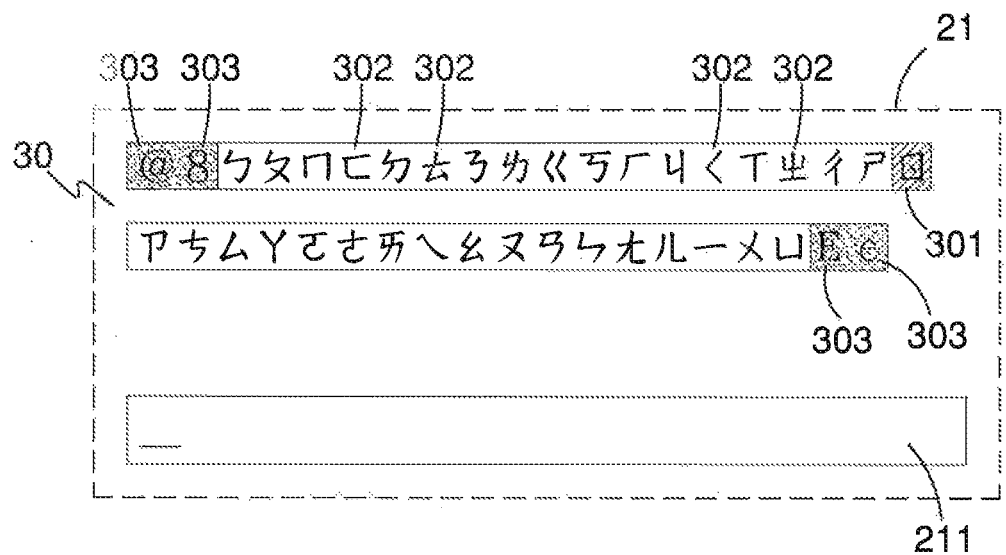

In FIG. 16, the screen 21 displays another type of the member group 30 with the content similar to the above mentioned member group 200. Different from the above, the members in the above mentioned member group 200 are regular member, yet the members in the member group 30 comprises several regular members 302 (for example " ㄅ "~" ㄩ ") also comprises several switch members 303 (the members in the grey background in the diagram). The user perform selection operations among regular members 302 according to the above mentioned description, and the selected or the last regular member 302 is entered in the editing column 211. Same with the regular members 302, the switch members 303 are also provided for user selection, and the selection operations are identical with the above mentioned embodiment. However, the last selected switch member 303 is not entered in the editing column 211; instead, it is switched with the regular member 302 in the member group 200.

Accordingly, in the embodiments shown in FIG. 16 to FIG. 26, the above mentioned inputting operations should be changed to: determining if the last member is one of the switch members 303. When the determining result is "No", the last member (which is a regular member 302) is entered in the editing column 211. When the determining result is "Yes", the members of the member group 30 are switched for including the group of regular members 302 which corresponds to a switch member 303 and the remaining switch members 303. The above mentioned third operating step should be changed to: when receiving a third signal from the input unit 22, determining if the selection members in the current member group 30 has a switch member 303. If the determining result is "No", the current selection member is entered in the editing column 211. When the determining result is "Yes", the members of the member group 30 are switched for including the group of regular members 302 which corresponds to and represents a switch member 303 and the remaining switch members 303.

Figure 17:
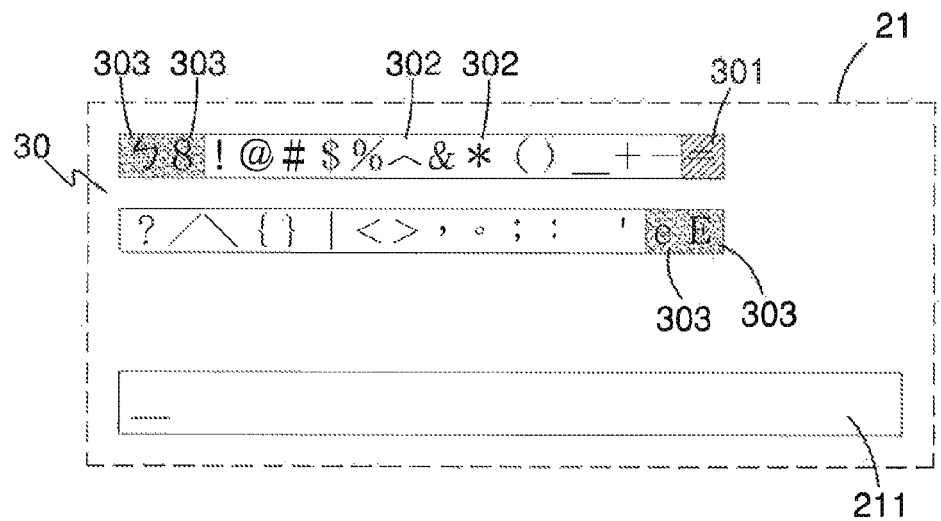
Figure 18:
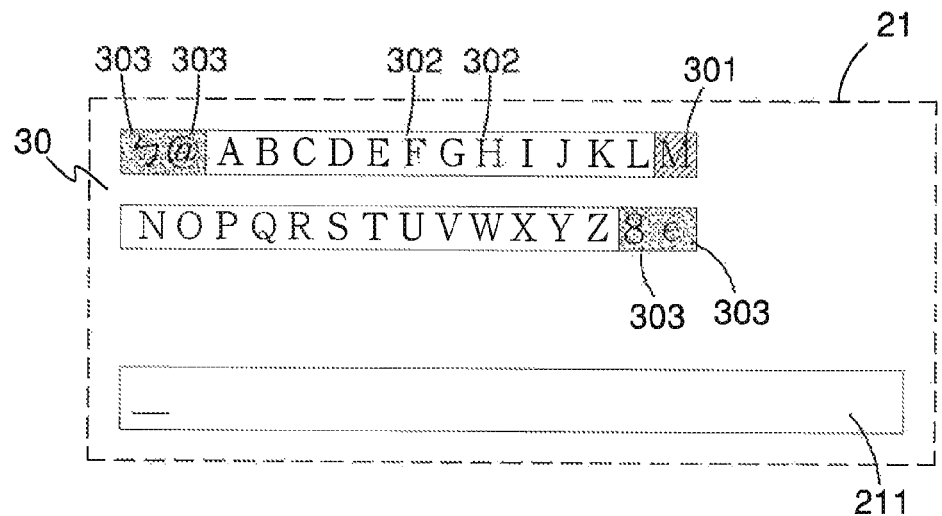
Figure 19:
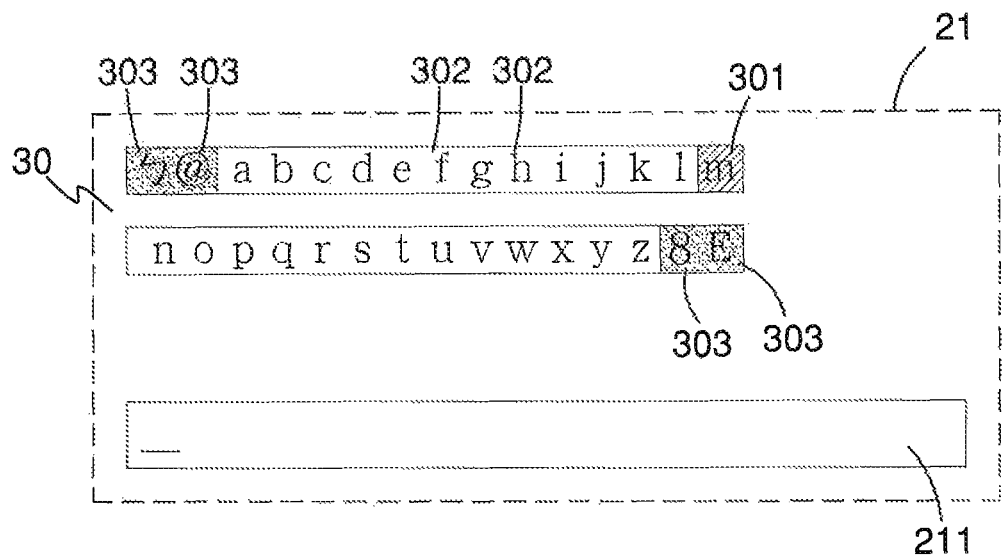
Figure 20:
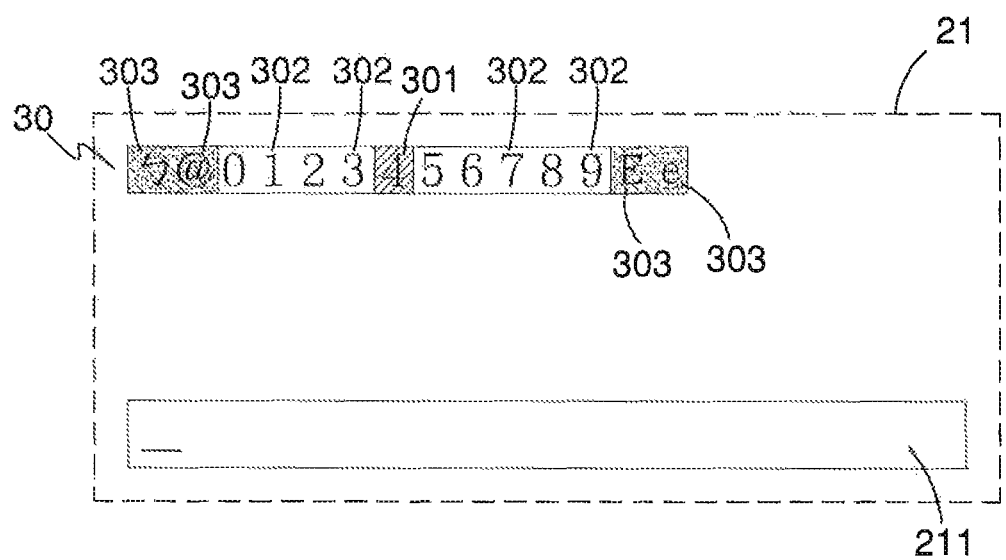

According to the above mentioned description, in the embodiment, the switch members 303 are respectively ㄅ ; @, E, e, 8, part of the switch members are lined up before the regular member 302, and part of the switch members are lined up after the regular member 302. Each switch member 303 corresponds to a group of regular members 303. In details, the switch member 303 " ㄅ " corresponds to and represents Mandarin Phonetic Symbol. As shown in FIG. 16, the switch member 303 " ㄅ " is hidden, yet other switch members 303 are displayed for user selection. "@" corresponds to and represents the regular members 302 including several punctuation marks and frequently used mathematic symbols. As shown in FIG. 17, the switch member 303 "@" is hidden, yet " ㄅ " and other switch members 303 are displayed for user selection. "E" corresponds to and represents the regular members 302 including several upper case English letters. As shown in FIG. 18, the switch member 303 "E" is hidden, yet "@" and other switch members 303 are displayed for user selection "e" corresponds to and represents the regular members 302 including several lower case English letters. As shown in FIG. 19, the switch member 303 "e" is hidden, yet "E" and other switch members 303 are displayed for user selection. "8" corresponds to and represents the regular members 302 including several numbers "0"~"9". As shown in FIG. 20, "8" the switch member 303 is hidden, yet "e" and other switch members 303 are displayed for user selection.

The members in the member group 30 are provided for selection including both the regular member 302 and the switch member 303. They can be assigned as the selection member 301 (the member in the slash background in the diagram). The operating method is identical with the embodiment above, which is completed by operating the keys of the input unit 22. For example, the next key 222 is pressed to generate the first signal which is received by the processing unit 20. If there are several members in the member group 30, the members before the selection member 301 are excluded. In FIG. 16, for example, the switch members "@Y", "8", and the regular members " ㄅ "~" ㄆ " are completely excluded or partly excluded, and the new selection member 301 is determined among remaining members. For another example, when the back key 221 is pressed to generate the second signal which is received by the processing unit 20. If there are several members in the member group 30, the members after the selection member 301 are excluded. For example, in FIG. 3, the regular members " ㄆ "~" ㄩ ", and the switch member "E" and "e" are completely excluded or partly excluded, and the new selection member 301 is determined among remaining members. For another example, when the enter key 223 is pressed and to generate the third signal which is received by the processing unit 20. If the current selection member 301 is a regular member 302, the regular member 302 is entered in the editing column 211; and if the current selection member 301 is a switch member 303, the screen 21 switches to display all regular members 302 correspond to and represent the switch member 303.

In FIG. 16 to FIG. 19, when the member count of total members in the member group 30 exceeds a predetermined value, the members are not able to display on the screen 21 in one row, the members are displayed in a plurality of rows on the screen 21 (for example an upper and a lower rows). When the processing unit 20 receives the first signal or the second signal, the members lined up before or after the selection member 301 are excluded in rows as the unit. Thus, the user presses the keys to generate the first signal or the second signal and the processing unit 20 executes the corresponding operating step according to the signals, then there is one row of members displayed on the screen 21 at the end, which is helpful visually to the user to locate the position of the member the user desires to input.

Figure 21:
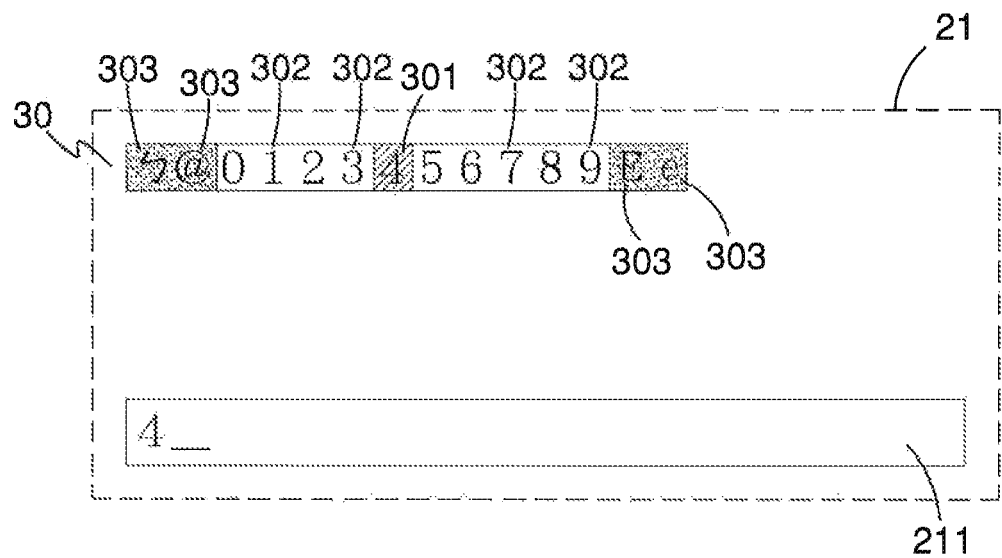

In FIG. 20 to FIG. 26, an embodiment is used for illustrating inputting a number "4" and an upper case English letter "E". First, as shown in FIG. 20, the member group 30 displayed on the screen 21 is a member group, and a regular member (the number "4") is predetermined as the selection member 301. At this point, the user only needs to press the enter key 223 to enter the selection member 301(the number "4") in the editing column 211, as shown in FIG. 21, at this point, the input of one member is completed; so again all members are displayed on the member group 30.

Figure 22:
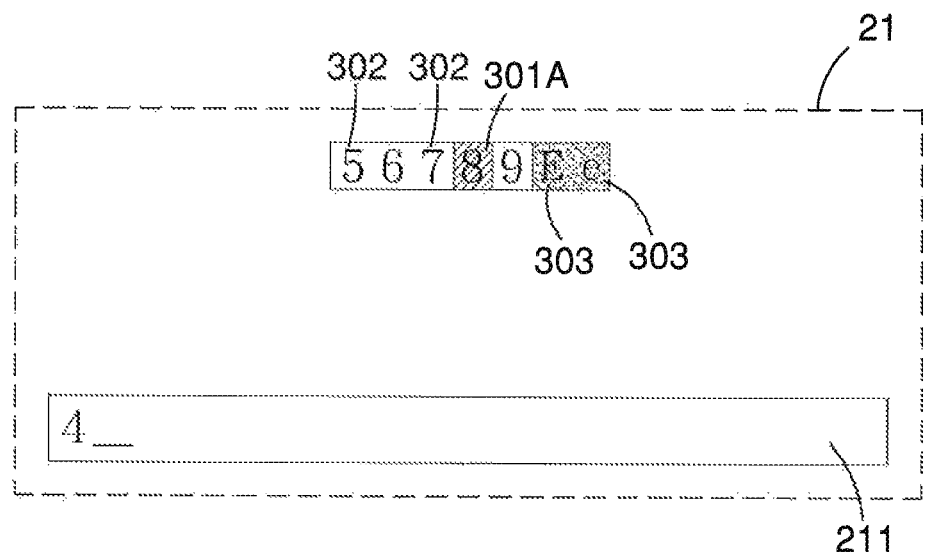
Figure 23:
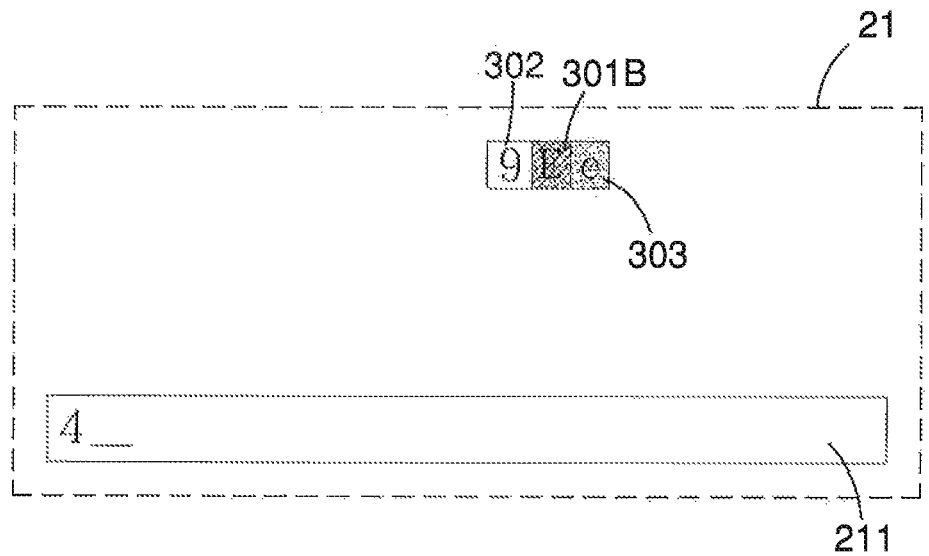
Figure 24:
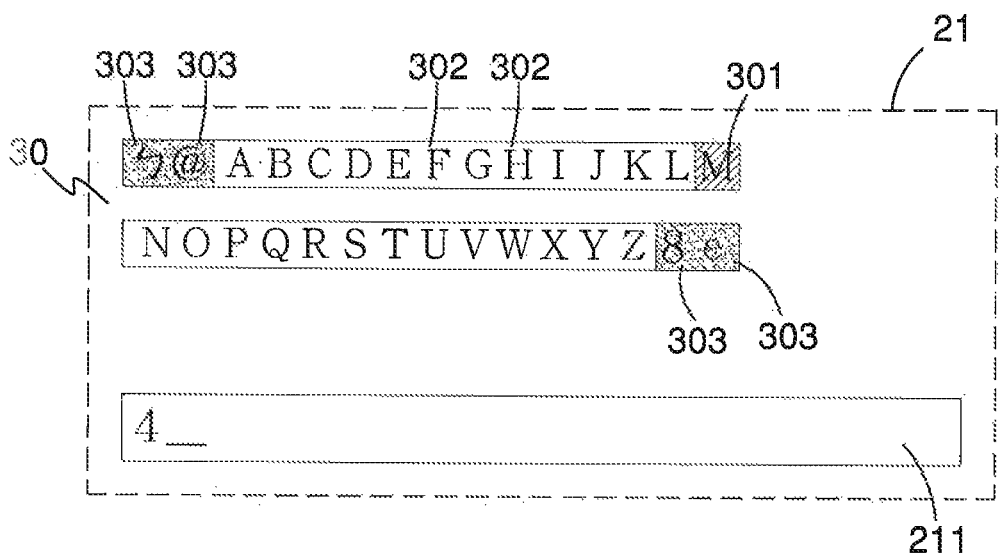

Next, the user desires to switch the member group 30 to the regular members 302 of upper case English letter. Because the members corresponds to "E" the switch member 303, "E" is lined up after the predetermined selection member 301, the user only needs to intuitively press the next key 222, the processing unit 20 receives the first signal corresponding to the next key 222, and then excludes all members before the selection member 301, and leaves all the members lined up after the selection member 301, as shown in FIG. 22, then determines a new selection member 301A (i.e. the number "8"). Because "E" the switch member 303 is still lined up after the selection member 301A, the user has to again press the next key 222. At this point, the processing unit 20 excludes all the members before the selection member 301A, and determines a new selection member 301B, as shown in FIG. 23. At this point, "E" the switch member 303 is determined as the selection member 301B. Accordingly, the user directly presses the enter key 223 to trigger the processing unit 20 to execute the third operating step corresponding to the third signal, i.e. switching to the upper case English letter corresponding to the "E" switch member 303 on the screen 21 as shown in FIG. 24.

Figure 25:
Figure 26:
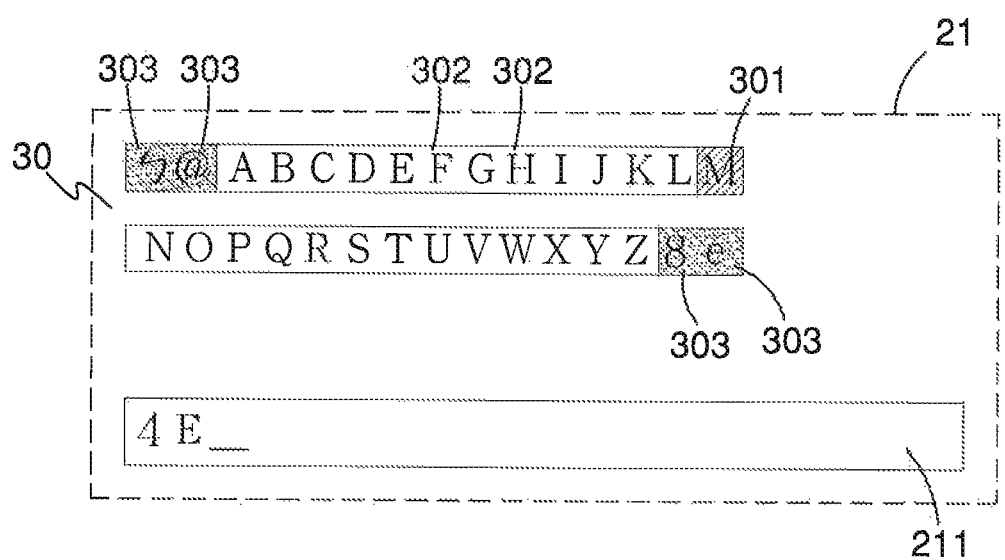

Next, because the user desires to input the letter "E: which is lined up before the predetermined selection member 301 in the member group 30. The user intuitively presses the back key 221, the processing unit 20 receives the second signal corresponding to the back key 221, and then excludes all members after the selection member 301, and leaves all the members lined up before the selection member 301, as shown in FIG. 25, then determines a new selection member 301C. At this point, the selection member 301C is the regular member (the upper case English letter "E") the user desires to input, the user directly presses the enter key 223, the processing unit 20 to trigger the processing unit 20 to execute the third operating step corresponding to the third signal, and enters the selection member 301C (the upper case English letter "E") in the editing column 211, as shown in FIG. 26. At this point, all members are displayed again in the member group 30 on the screen 21.

Compare to the prior art, the technology disclosed in the present invention is suited to use in compact electronic devices, only a few input signals are required to complete the operating steps, which makes the input process fast and intuitive, and reduces the time spent on searching for the inputting text. In addition, the present invention provides an easy method to switch between different input text.

In addition, when members are excluded in the above mentioned member group, the user may press the up key 224 to generate a fourth signal, the processing unit 20 restores the members excluded previously, and the members are displayed in the member group again. Further, if a member is entered in the above mentioned editing column, and there is no members excluded in the member group, At this point, if the user presses the up key 224 to generate the fourth signal, the processing unit 20 deletes the member previously entered in the editing column. In short, the up key 224 has functions to restore members and delete members. Furthermore, if a member is entered in the above mentioned editing column, and the member group and there is no members excluded in the member group. At this point, if the user presses the enter key 223, the processing unit 20 receives the signal corresponding to the enter key 223, then transfer the member in the editing column outbound, for example: transfer to a textbox.

Under the scenario where the members of the member group are the coordinates of the screen 21, the coordinates predetermined as the selection members are cursor coordinates on screen 21. For example, provided the resolution of the screen 21 is setup as 1024×768 and the cursor is in the center point of the screen 21 with the coordinates as (512, 384). At this point, an Application Programming Interface (API) from the operating system provide resource to obtain coordinates of the center point (512,384) and two coordinates (0,384) and (1024,384) which is at the same horizontal line of the coordinates (512,384). At this point, the members in the member group are (0,384), (512,384), (1024,384) and other coordinates (x,y) which derive from the calculation of the three coordinates given y=384, wherein (512,384) is the selection member. Under the specific scenario, the processing unit 20 executes the first operation step according to the first signal received. Then, the members in the member group become (0,384), (255,384) and (511,384). Because (512,384) and the coordinates after (512,384) are excluded, and (255, 384) in the middle is determined as the selection member. At this point, the processing unit 20 moves the cursor to the selection member (255,384), which equals to that the cursor moves horizontally to the left along a horizontal line for a distance which is about the half of the distance between two coordinates (0,384) and (1024,384) to the user. When the processing unit 20 executes the first operation step for a second time, the members in the member group become (0,384), (127,384) and (254,384). The (127,384) in the middle is determined as the selection member, and the cursor moves to the selection member (127,384), which equals to that the cursor moves horizontally to the left along a horizontal line for a distance which is about the half of the distance between two coordinates (0,384) and (254,384) to the user. When the processing unit 20 executes the second operation step for a second time according to the second signal received, the members in the member group become (128,384), (191, 384), (254,384). Because (127,384) and all the coordinates before (127,384) are excluded, and (191,384) in the middle is determined as the selection member. At this point, the processing unit 20 moves the cursor to the selection member (191,384), which equals to that the cursor moves horizontally to the right along a horizontal line for a distance which is about the half of the distance between two coordinates (128384) and (254,384) to the user, and so on. After the processing unit 20 repeats executing the first operation step, the members in the member group in the end become (128, 384), (129,384) and (130,384), and (129,384) is the selection member. After the processing unit 20 then again executes the second operation step once, there is only one member (130, 384) in the member group because the selection member (129,384) and the coordinates before (128,384) are excluded. At this point, the processing unit 20 determines that there is only one member (130,384) in the member group, and then executes an input operation which is restoring the members in the member group, and determines the last member to be the selection member. At this point, the members in the member group are (0,384), (130,384), (1024,384) and other coordinates (x,y) which derive from the calculation of the three coordinates given y=384, wherein (130,384) is the selection member and at this point the cursor is at (130,384).

According to the above description, when the members in the member group are coordinates on the same horizontal line, the cursor is allowed to move to the left and to the right by using the above mentioned input method and the moving distance is the half of the last moving distance. If the members in the member group are coordinates on the same vertical line, the above mentioned first operation step is changed to the fourth operation step, the second operation step is changed to the fifth operation step. The fourth operation step is: when the signal is the fourth signal generated upon the up key 224 is pressed, the members after the selection member in the member group are excluded. Preferably, the selection member is also excluded. Then, determining if there is only one member left in the member group. If the determining result is "No", the member in the middle or before the middle or after the middle in the member group is determined as the new selection member; if the determining result is "Yes", executing an input operation, for example restoring the members in the member group and the last member replaces the member which is preciously the selection member. The fifth operation step is: when the signal is the fifth signal generated upon the down key 225 is pressed, the members before the selection member in the member group are excluded. Preferably, the selection member is also excluded. Then, determines if there is only one member left in the member group. If the determining result is "No", the member in the middle or before the middle or after the middle in the member group is determined as the new selection member; if the determining result is "Yes", executing an input operation, for example restoring the members in the member group and the last member replaces the member which is preciously the selection member.

In FIG. 27 to FIG. 32, the input control application 1 is further configured for controlling the cursor movement. Substantially, the processing unit 20 controls the moving direction and moving distance of the cursor 5 on the screen 21 according to moving signals generated upon pressing the back key 221, the next key 222, the down key 225 and the up key 224. If the moving signal is a left moving signal (i.e. the above mentioned first signal), the cursor 5 is controlled to linearly move to the left. If the signal is a right moving signal (i.e. the above mentioned second signal), the cursor 5 is controlled to linearly move to the right. If the signal is a up signal (i.e. the above mentioned fourth signal), the cursor 5 is controlled to linearly move upwards. If the signal is a down signal (i.e. the above mentioned fifth signal), the cursor 5 is controlled to linearly move downwards. The distance of the first horizontal linear movement of the cursor 5 is the half of the distance between the starting coordinates of the cursor and the horizontal boundary (left boundary or right boundary) of the screen 21. Then the distance of following horizontal distance is the half of the last moving distance. The distance of the first vertical linear movement of the cursor 5 is the half of the distance between the starting coordinates of the cursor 5 and the vertical boundary (upper boundary or lower boundary) of the screen 21. Then the distance of following vertical distance is the half of the last moving distance.

Figure 27:
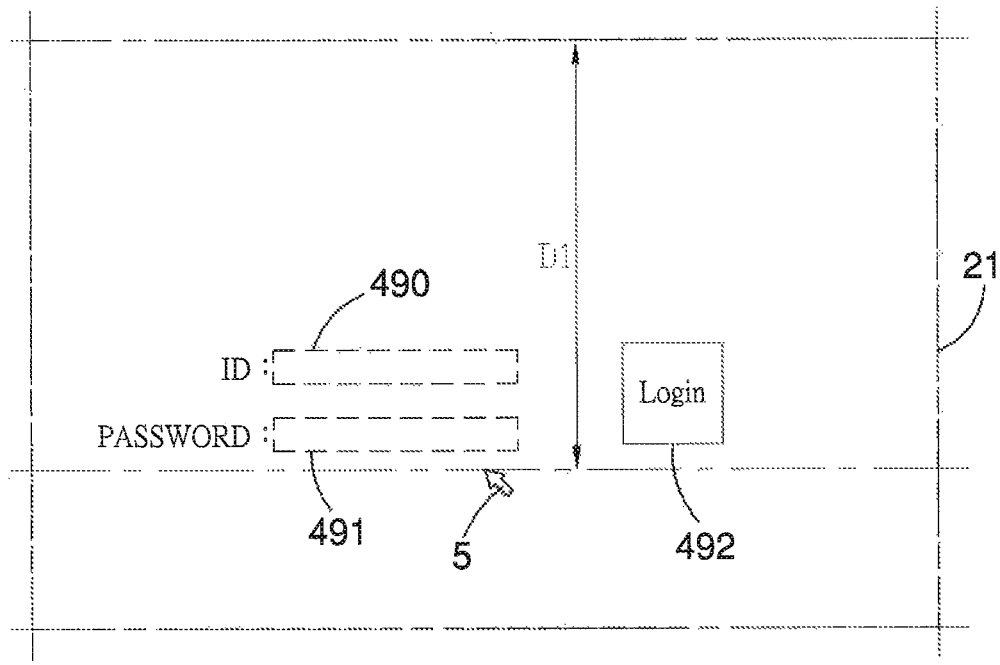
FIG. 27 to FIG. 31 are diagrams illustrating the display content on the screen used for explaining the process of a user controlling cursor movement.
Figure 28:
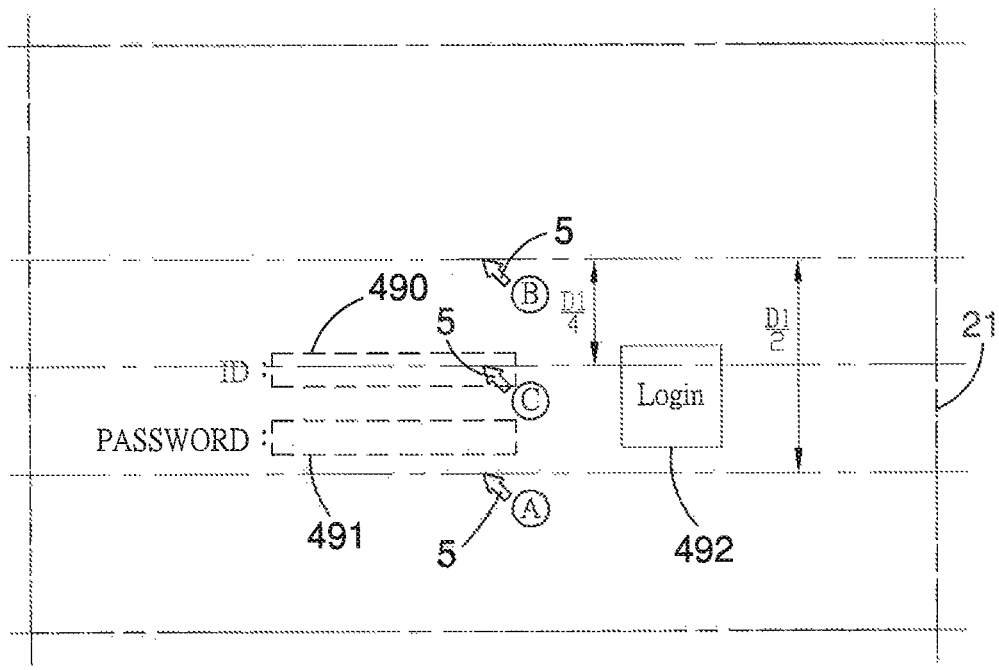

For example, as shown in FIG. 27, a user desires to move the cursor on the screen 21 from the starting point A to an ID column 490 on the screen 21. Because the ID column 490 is located above the cursor 5, the user may perceive to intuitively press the up key 224 to generate the up signal. The processing unit 20 receives the up signal, and then controls the cursor 5 to linearly move upwards from the starting point A to the new position B, as shown in FIG. 28. This is the first vertical movement of the cursor 5. The moving distance of the cursor 5 is D2 (D1/2), which is the half of the distance D1 between the starting point A and the upper boundary U of the screen 21.

Next, as shown in FIG. 28, the ID column 490 is currently located below the position B of the cursor 5. The user further presses the down key 225 to generate the down signal. The processing unit 20 receives the down signal, and then controls the cursor 5 to linearly move downwards from the position B to the new position C. The moving distance is half of the last moving distance, which is [(D1/2)/2=D1/4]. At this point, the position C of the cursor 5 overlaps with the position of the ID column 490, which means, the user completes the operation to move the cursor 5 to the ID column 490.

Figure 29:
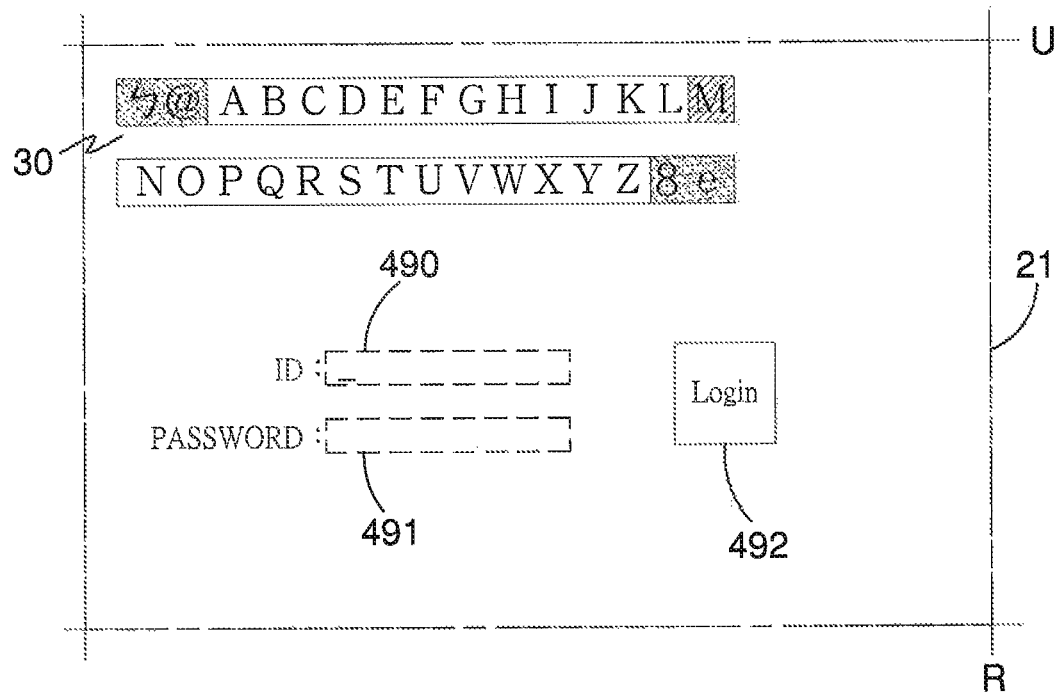

Preferably, after the cursor 5 moves to the ID column 490, if the processing unit 20 further receives the generated signal after the enter key 223 is pressed, the processing unit 20 transfer the ID column 490 to a status ready to receive input, and displays the member group on the screen 21, and removes the cursor 5, as shown in FIG. 29, wherein English letters are displayed in the member group 30 for selection, the operating process is described in the above and is not repeated hereto.

Figure 30:
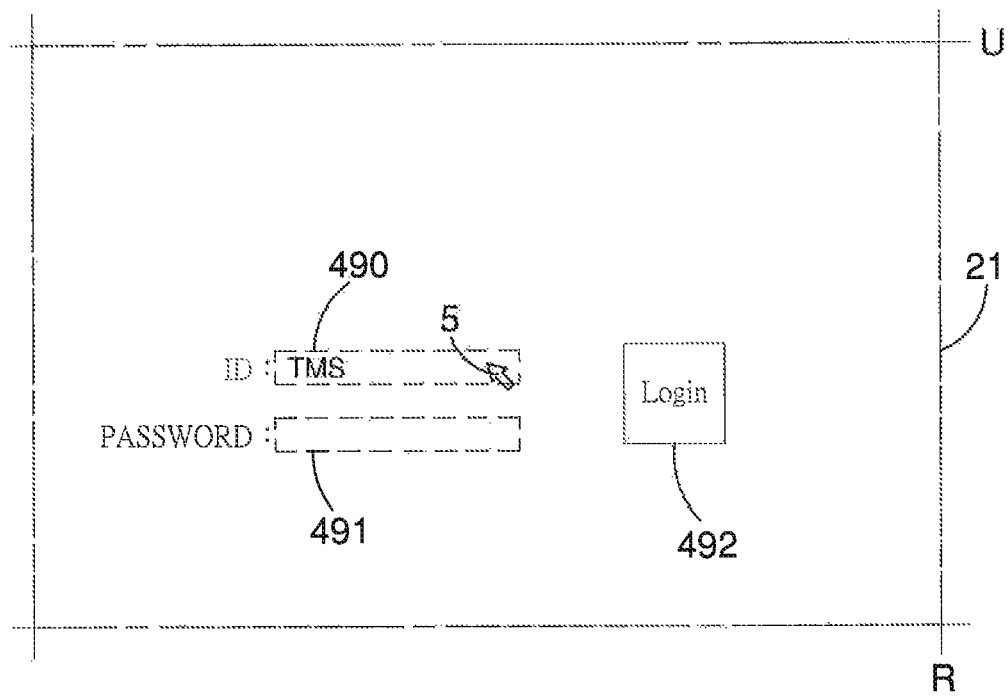

As shown in FIG. 30, the user next desires to move the cursor 5 to a password column 491. The user again presses the enter key 223, and then the cursor 5 is displayed on the screen 21 again. Next, the user controls the cursor 5 to move to the password column 491 according to the operations mentioned above.

Figure 31:
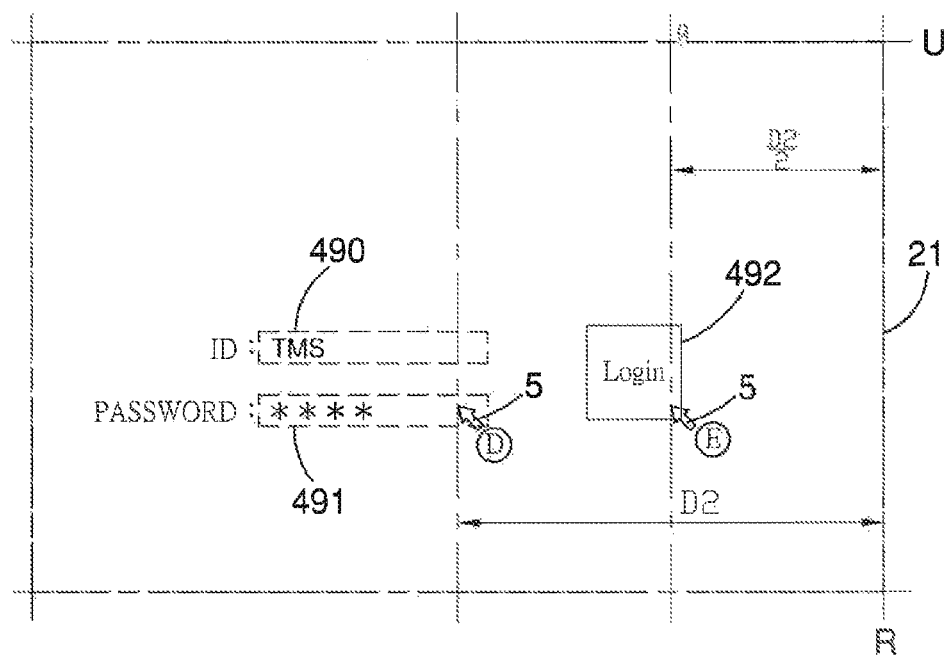

In FIG. 31, the user presses a key 492 in the screen 21. Because the key 492 is located at the right side of the cursor 5, at this point, the user presses the next key 22 and generates the right moving signal. The processing unit 20 controls the cursor 5 to move to the right from the starting point D to a new position E according to the right moving signal. The moving distance is the half of the distance D2 between the starting point D and the right boundary R of the screen 21. At this point, the location E of the cursor 5 overlaps with the position of the login key 492, the user presses the enter key 223 to generate the confirm signal, the processing unit 20 triggers the login key 492 according to the confirm signal.

In addition, when the processing unit 20 receives any moving signal, and the distance which the cursor 5 expects to move is zero, the processing unit 20 proceeds to reset procedure, which makes the moving distance of the cursor 5 become the half of the distance between the current coordinates (starting point) and one of the boundaries of the screen 21 were the boundary can be an upper boundary, lower boundary, left boundary or right boundary, depending on the moving direction of the cursor 5.

In any case, one would understand that the present invention contains industrial applicability in view of the teachings of the forgoing description. Further, the present invention contains novelty because no prior art has been found to be the same with the present invention. Still further, the present invention contains non-obviousness because no prior art has been found to be similar to the present invention. Accordingly the present invention fulfills the requirements for a utility patent and is filed herein for application.

The invention claimed is:

1. An electronic device comprising a processing unit, a screen, an input unit and a storage unit, the storage unit having an input control application, the processing unit receiving signals generated by the input unit, and executing actions, the actions comprising:

obtaining a member group, the member group comprising members lined up orderly, and one of the members is a selection member;

when the signal is a first signal, excluding the member after the current selection member, then determines if there is only one last member left in the current member group, if the determining result is "No", the member in the middle or before the middle or after the middle is determined as the selection member, if the determining result is "Yes", executing an input operation; and when the signal is a second signal, excluding the member before the current selection member, then determines if there is only one last member left in the current member group, if the determining result is "No", the member in the middle or before the middle or after the middle is determined as the selection member, if the determining result is "Yes", executing an input operation.

2. The electronic device of claim 1, wherein the current member group and an editing column are displayed on the screen, the input operation comprising entering the last member in the editing column.

3. The electronic device of claim 2, wherein the actions further comprising:

when receiving a third signal from the input unit, entering the current selection member of the member group in the editing column.

4. The electronic device of claim 1, wherein the processing unit excludes the members before or after the current selection members, and also excludes the current selection member.

5. The electronic device of claim 2, wherein the members of the member group are lined up based on numerical order, alphabetical order of the upper case English letter, alphabetical order of lower case English letter, Mandarin Phonetic Symbol, or punctuation marks.

6. The electronic device of claim 2, wherein the actions comprises executing a change step when the last member is entered in the editing column used for changing the members of the member group with another group of new members, and determining the member lined up in the middle or before the middle or after the middle as the selection member, wherein the group of new members are associated phonetically with the member in the editing column.

7. The electronic device of claim 3, wherein the actions comprising executing a change step when the current selection member is member is entered in the editing column used for changing the members of the member group with another group of new members, and determining the member lined up in the middle or before the middle or after the middle as the selection member, wherein the group of new members are associated phonetically with the member in the editing column.

8. The electronic device of claim 1, wherein the members of the member group comprising several switch members and a group of regular members, each switch member corresponding to a group of regular members respectively, the current member group and a editing column displayed on the screen, the input operation comprising:

determining if the selection member of the member group is a switch member;

when the determining result is "No", the last member is entered in the editing column;

when the determining result is "Yes", switching the members of the member group for including the group of regular members which corresponds to a switch member and the remaining switch members.

9. The electronic device of claim 8, wherein the actions further comprises:

when receiving a third signal from the input unit, determining if the selection member of the member group is a switch member, if the determining result is "No", the current selection member is entered in the editing column, if the determining result is "Yes", switching the members of the member group for including the group of regular members which corresponds to and represents a switch member and the remaining switch members.

10. The electronic device of claim 1, wherein, the members of the member group are the coordinates of the screen, the coordinates are located on the same linear line, and the coordinates of the selection member is the position of the cursor on the screen.

* * * * *